United States Patent

Nakai et al.

[11] Patent Number: 6,043,903
[45] Date of Patent: *Mar. 28, 2000

[54] FACSIMILE APPARATUS WITH AUTOMATIC PRINT OUT OF INFORMATION UNITS STORED IN MEMORY

[75] Inventors: Kiyomoto Nakai, Hino; Osamu Ichii, Tokyo; Shinya Watanabe, Hino, all of Japan

[73] Assignee: Toshiba Tec Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/667,638

[22] Filed: Jun. 21, 1996

[30] Foreign Application Priority Data

Jun. 30, 1995 [JP] Japan .................................... 7-165709

[51] Int. Cl.[7] ............................. H04N 1/32; H04N 1/327; H04N 1/21
[52] U.S. Cl. ............................ 358/437; 358/440; 358/444
[58] Field of Search ..................................... 358/440, 434, 358/437, 435, 438, 439, 468, 402, 444; 379/100, 100.05, 100.06

[56] References Cited

U.S. PATENT DOCUMENTS 5,155,602  10/1992  Terajima .................................. 358/440
5,245,651   9/1993  Takashima et al. .................... 379/100

FOREIGN PATENT DOCUMENTS 5-268318  10/1993  Japan .
6-86041    3/1994  Japan .

*Primary Examiner*—Scott Rogers
*Attorney, Agent, or Firm*—Frishauf, Holtz, Goodman, Langer & Chick, P.C.

[57] ABSTRACT

When an incoming call has been received, caller identification sent from a network is detected by a caller identification transformer unit, a MODEM unit and a CPU. A predetermined information unit included in the caller identification is displayed on an LCD. Whether or not an answer to the incoming call is to be made, the predetermined information included in the caller identification is stored in an incoming-call journal data memory unit as incoming-call journal data. The incoming-call journal data is automatically printed out by a printer unit as an image at a predetermined timing.

6 Claims, 10 Drawing Sheets

```
0427990000      TOM   BROWN
```

F I G.  4

| DATE | TIME | TEL.NO. | NAME OF CALLER | PRESENCE / ABSENCE OF ANSWER |
|---|---|---|---|---|
| 6. 26. 1995 | 12:00 | 0427990000 | TOM BROWN | |
| 6. 26. 1995 | 13:28 | 0312349999 | JUDY FORD | NO ANSWER |

F I G.  5

\* THE FOLLOWING CALLS CAME THROUGH IN A TROUBLED STATE

| DATE | TIME | NAME OF CALLER | TEL. NO. |
|---|---|---|---|
| 03. 23 | 09:00 | ○○ DIVISION IN H. Q | 0300001111 |
| 03. 23 | 09:10 | ××× CORPORATION | 0425001234 |

F I G.  8

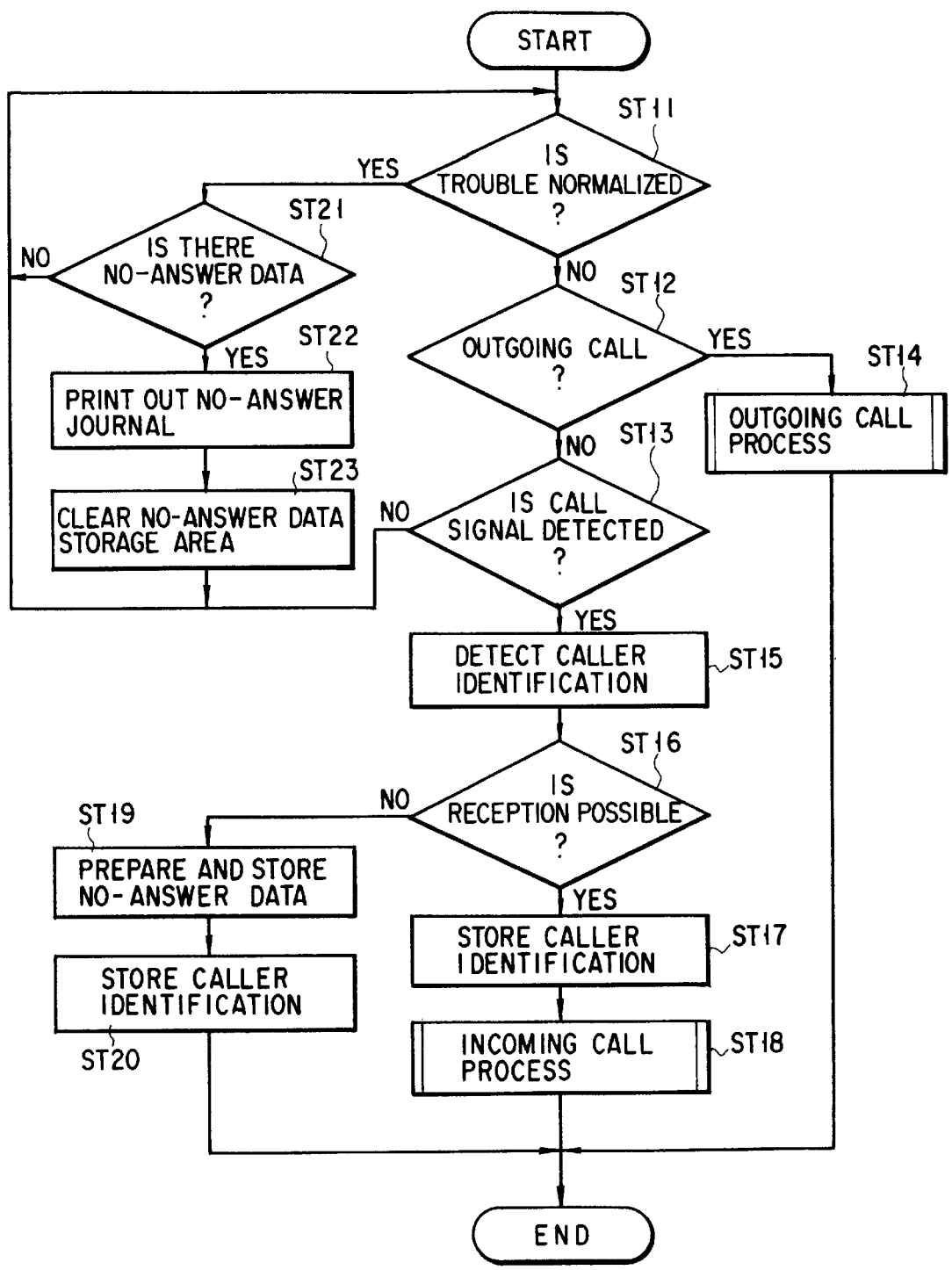
F I G. 7

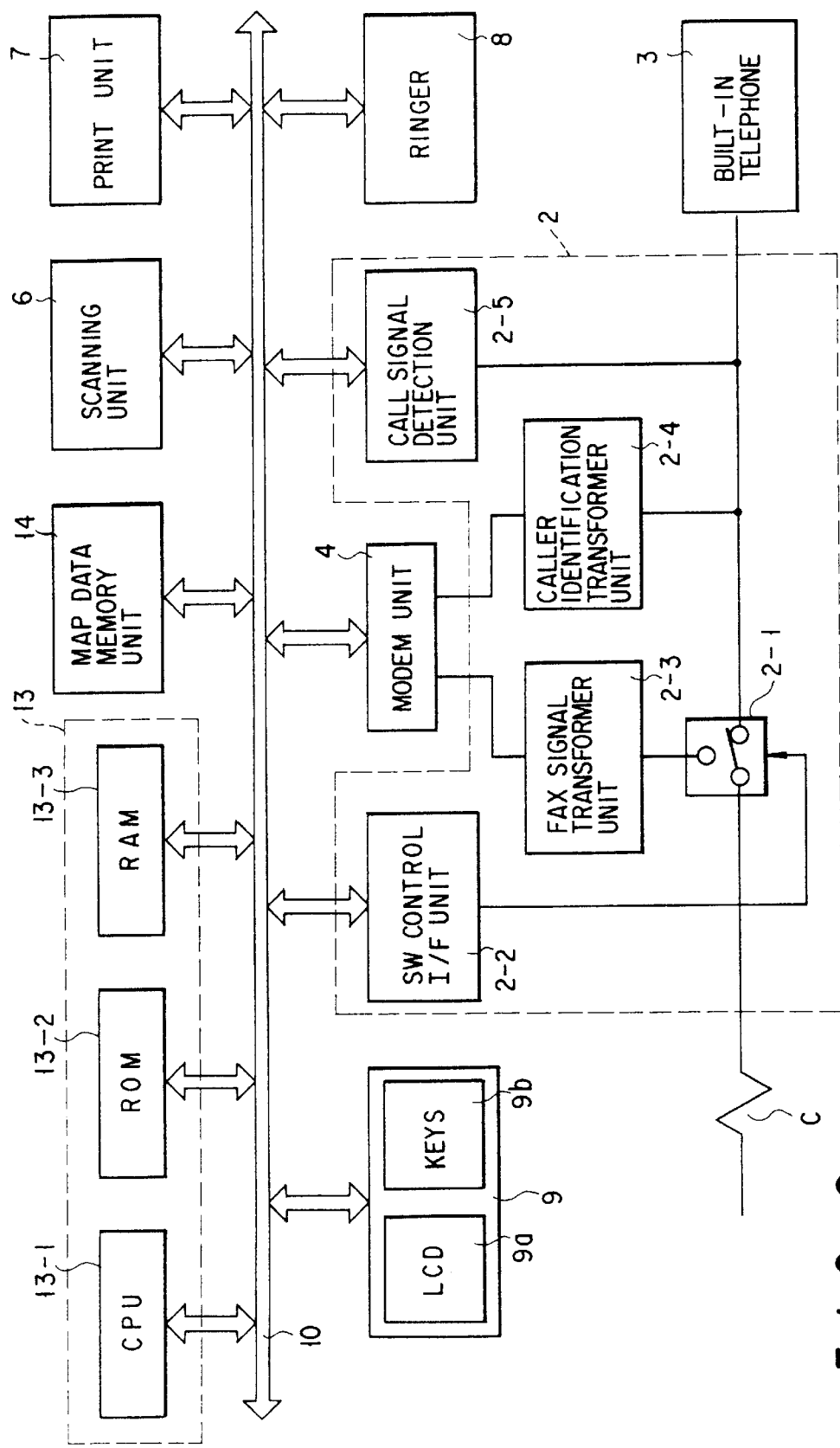
F I G. 9

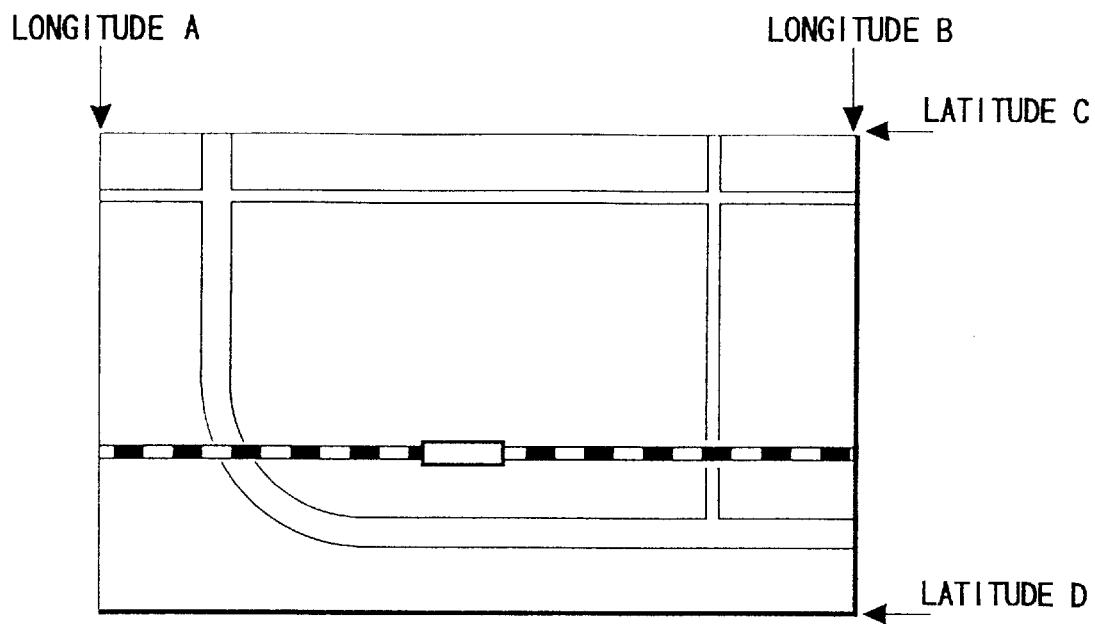
F I G. 11
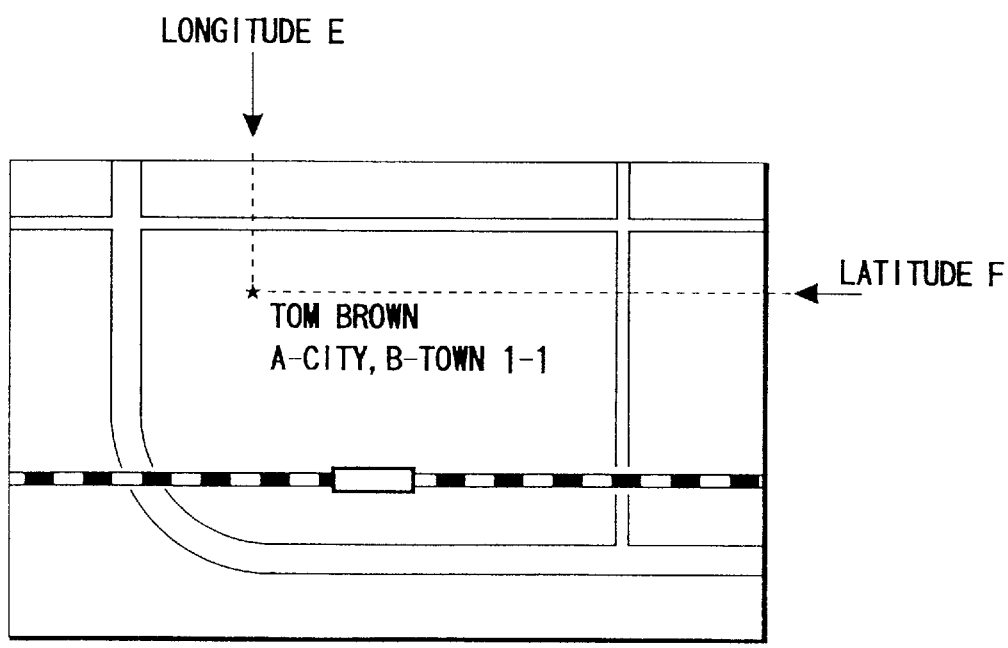
F I G. 12

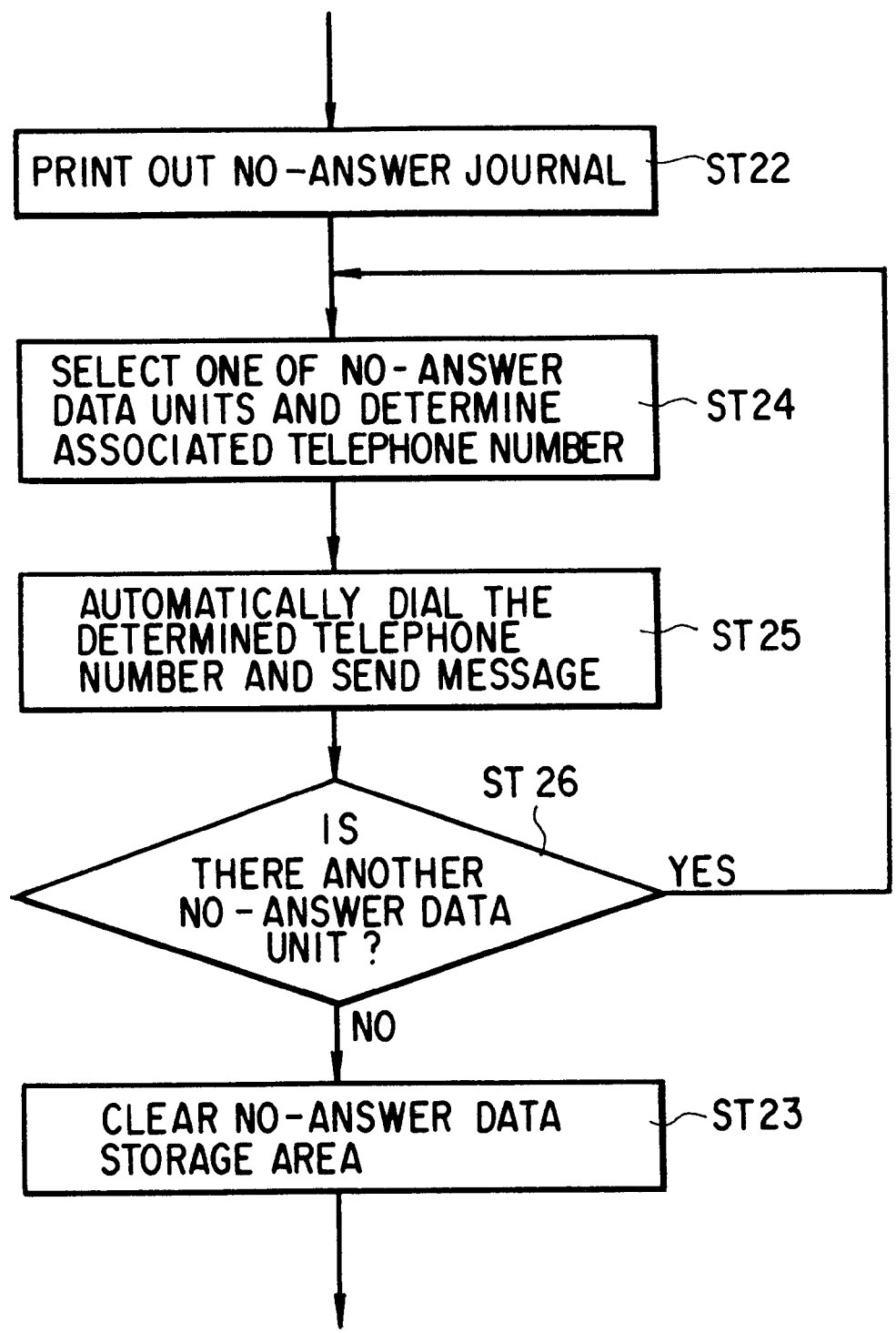
F I G. 13

FACSIMILE APPARATUS WITH AUTOMATIC PRINT OUT OF INFORMATION UNITS STORED IN MEMORY

BACKGROUND OF THE INVENTION

1. Field of the Invention

The present invention relates to a facsimile apparatus suitable for connection to a communication network wherein an incoming call side is informed of identification information of an outgoing call side.

2. Description of the Related Art

In a conventional analog telephone network, e.g. in an analog telephone network providing service called "CLASS", an incoming call side subscriber is informed of the number of an outgoing call side, etc. In the "CLASS" service, data of a predetermined format including date information (month, day, hour, minute) and caller identification such as the number of the outgoing call side is superimposed on a ringing signal and given to the incoming call side.

The incoming call side detects the transmitted data and can be informed of the number of the outgoing call side, etc. without answering the answered incoming call. Based on the number of the outgoing call side, etc. the incoming call side can determine whether or not to answer the incoming call, and can avoid answering the incoming call from a specific outgoing call side.

In a general facsimile apparatus, a communication journal of actual communication records can be stored and printed out in a table format. The communication journal, however, indicates only actually performed (completed) communication records between the incoming call side and the outgoing call side. If the incoming call side does not answer the incoming call, as mentioned above, such record cannot be ascertained later.

For example, if the incoming call side is unable to answer the call owing to lack of printing paper sheets, information relating to the reception of the incoming call is not included in the communication journal. Thus, the user is unable to know the fact of reception of an incoming call to which he/she could not answer.

In addition, the conventional facsimile apparatus does not have a function of informing the user of the location of the caller or outgoing call side.

If the user wishes to know the location of the caller, he/she needs to, e.g. make a telephone call to the caller and ask him/her to transmit a map indicating the location to the user. Such a process is time-consuming.

SUMMARY OF THE INVENTION

The present invention has been made in consideration of the above circumstances, and a first object of the invention is to provide a facsimile apparatus wherein when a call has been received, a user can recognize the caller prior to answering the incoming call and the user can decide whether or not to answer the incoming call in consideration of the caller, and the user can be informed of incoming-call journal data relating to at least a call to which no answer was made.

A second object of the invention is to provide a facsimile apparatus wherein the user can be informed of information relating to an incoming call to which no answer could be made since facsimile information could not be received.

A third object of the invention is to provide a facsimile apparatus capable of informing the user of the location of the caller or outgoing call side.

The first object of the invention can be achieved by a facsimile apparatus comprising:

A reception section for receiving predetermined identification information indicating a caller, the identification information being included in a call signal sent from a communication network connected to the facsimile apparatus at the time of an incoming call;

A display for displaying a predetermined information unit included in the identification information received by the reception section;

answer presence/absence determining means for determining whether an answer has been made to the incoming call from the caller;

A storage device for storing at least the predetermined information unit included in the identification information received by the reception section with respect to the incoming call, when the absence of an answer has been determined by the answer presence/absence determining means; and A printer for automatically printing out at a predetermined timing the predetermined information units stored in the storage device so as to be distinguishable from information associated with the incoming call, when the absence of an answer has been determined by the answer presence/absence determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 shows an example of display of the caller identification on an LCD in FIG. 1;

FIG. 5 shows an example of an image printed out as incoming-call journal data;

FIG. 7 is a flowchart illustrating the control procedures of a main control section in FIG. 6;

FIG. 8 shows an example of an image printed out as journal of an incoming call to which no answer has been made;

FIG. 9 is a functional block diagram showing a main structure of a facsimile apparatus according to a third embodiment of the present invention;

FIG. 11 shows an example of an image of a registered map;

FIG. 12 shows an example of an image printed out as a map of a caller's location; and FIG. 13 is a flowchart illustrating a modification of the control procedures of the main control section in the second embodiment.

DETAILED DESCRIPTION OF THE PREFERRED EMBODIMENTS

First Embodiment

A first embodiment of the present invention will now be described with reference to the accompanying drawings.

Figure 1:
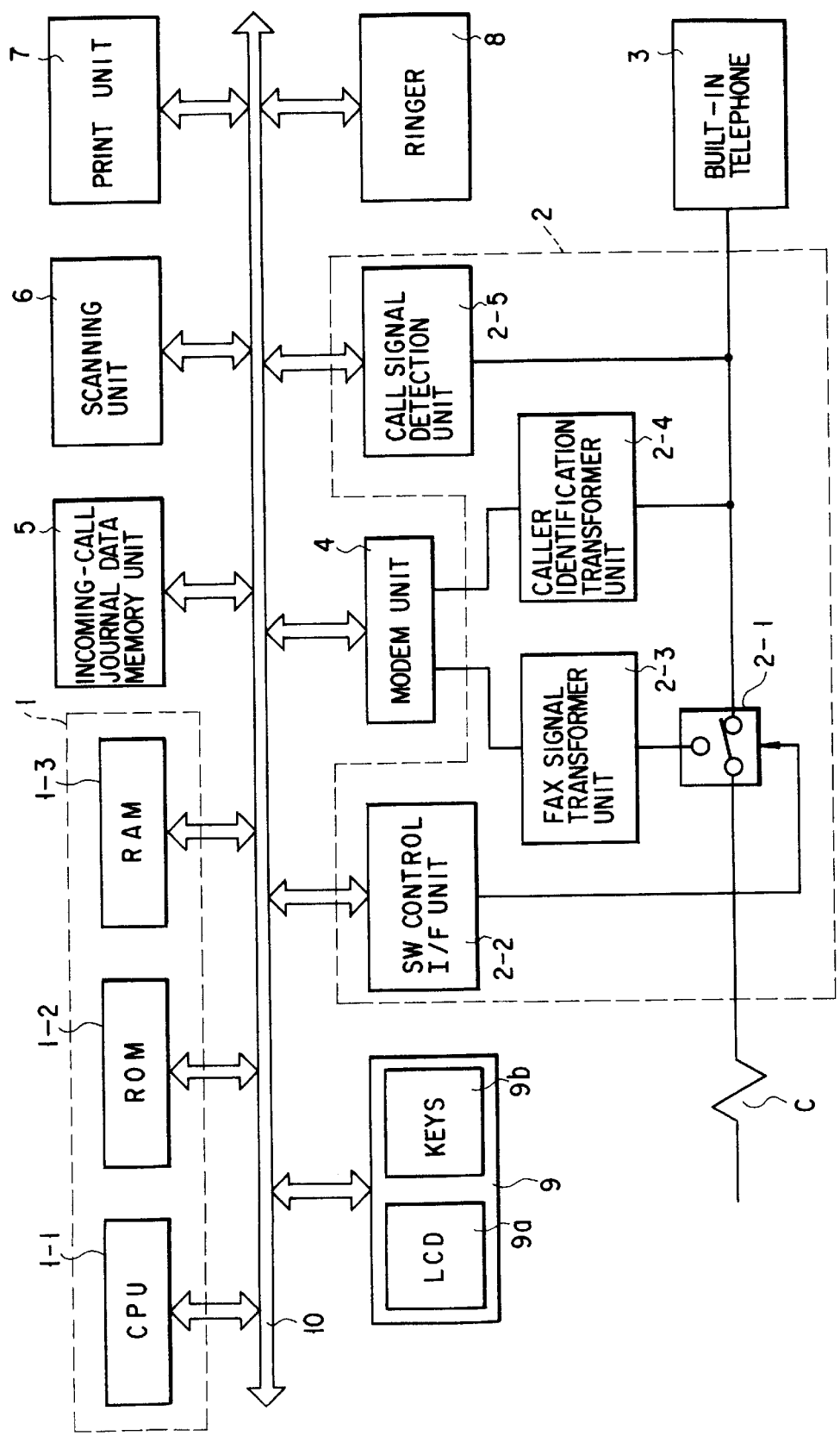
FIG. 1 is a functional block diagram showing a main structure of a facsimile apparatus according to a first embodiment of the present invention.

FIG. 1 is a functional block diagram showing a main structure of a facsimile apparatus according to this embodiment. The facsimile apparatus of this embodiment, as shown in FIG. 1, comprises a main control section 1, a network control section 2, a built-in telephone 3, a MODEM unit 4, an incoming-call journal data memory unit 5, a scanning unit 6, a print unit 7, a ringer 8 and an operation panel unit 9. The main control section 1, network control section 2, MODEM unit 4, incoming-call journal data memory unit 5, scanning unit 6, print unit 7, ringer 8 and operation panel unit 9 are interconnected by means of a system bus 10 comprising a data bus, an address bus and a control bus.

The main control section 1 comprises a CPU (Central Processing Unit) 1-1, a ROM (Read-Only Memory) 1-2 and a RAM (Random Access Memory) 1-3. The CPU 1-1, ROM 1-2 and RAM 1-3 are all connected to the system bus 10. The CPU 1-1 operates according to operation programs stored in the ROM 1-2 and controls the operation of each structural part, thereby effecting the total operation of the facsimile apparatus. The ROM 1-2 stores in a fixed manner the operation programs for the CPU 1-1 and the information necessary for the various processing carried out by the CPU 1-1. The RAM 1-3 temporarily stores various data necessary for the various processing performed by the CPU 1-1.

The CPU 1-1 in the main control section 1 runs the operation programs stored in the ROM 1-2, and thus the main control section 1 can achieve the following first to fourth control means in addition to the general control means in the facsimile apparatus: 1) to detect caller identification taken in through a caller identification transformer unit 2-4 and the MODEM unit 4 and recognize the caller identification, 2) to control an LCD 9a so as to display information contained in the caller identification detected and recognized by the first means, 3) to generate incoming-call journal data on the basis of the caller identification detected and recognized by the first means, and store the generated information in the received-call history memory unit 5, and 4) to control the print unit 7 to print out an image indicating the incoming-call journal data each time the number of incoming-call journal data units stored in the incoming-call journal data memory unit 5 has reached a predetermined number N.

The network control section 2 functions as interface between signals transmitted through a communication line C and signals transmitted through the system bus 10, and switches the connection destination of the communication line C between the built-in telephone 3 and the MODEM unit 4.

The built-in telephone 3 is a conventional telephone including, e.g. a transmitter/receiver and a call circuit. The built-in telephone 3 is used to perform a speech call.

The MODEM unit 4 demodulates a facsimile transmission signal and a caller identification signal coming through the communication line C, thereby to reproduce facsimile data and caller identification and output the data and information to the system bus 10. In addition, the MODEM unit 4 modulates facsimile data delivered via the system bus 10, converts the facsimile data to a facsimile transmission signal, and outputs the facsimile transmission signal to the communication line C via the network control section 2.

The incoming-call journal data memory unit 5 stores incoming-call journal data generated on the basis of the caller identification sent from the network side.

The scanning unit 6 scans a transmission document to generate facsimile data, or scans an image indication information to be received by the present facsimile apparatus.

The print unit 7 prints out on a printing paper sheet an image corresponding to facsimile data reproduced by the MODEM unit 4 from the facsimile transmission signal coming through the communication line C, or an image indicating notice information to the user.

The ringer 8 rings under control of the main control section 1 in order to notify the user of the reception of the incoming call.

The operation panel unit 9 comprises an LCD 9a for displaying various information to the user, and keys 9b by means of which the user input various commands to the main control section 1.

The network control section 2 comprises a FAX/TEL change-over switch 2-1, a switch control interface unit (SW control I/F unit) 2-2, a facsimile (FAX) signal transformer unit 2-3, caller identification transformer unit 2-4, and a call signal detection unit 2-5.

The FAX/TEL change-over switch 2-1 connects the communication line C to one of the FAX signal transformer unit 2-3 and built-in telephone 3. The SW control I/F unit 2-2 generates a control signal for controlling the FAX/TEL change-over switch 2-1, on the basis of control data supplied via the system bus 10, and delivers the control signal to the FAX/TEL change-over switch 2-1.

The FAX signal transformer unit 2-3 receives a facsimile transmission signal coming through the communication line C and delivers the facsimile transmission signal to the MODEM unit 4. The caller identification transformer unit 2-4 is connected to the communication line C when the communication line C is connected to the built-in telephone 3 by the FAX/TEL change-over switch 2-1. The caller identification transformer unit 2-4 receives a caller identification signal from the network side at the time of call reception and supplies the caller identification signal to the MODEM unit 4. The call signal detection unit 2-5 is connected to the communication line C when the communication line C is connected to the built-in telephone 3 by the FAX/TEL change-over switch 2-1. The call signal detection unit 2-5 detects a call signal sent from the network side to notify the incoming call side of the incoming call.

Figure 2:
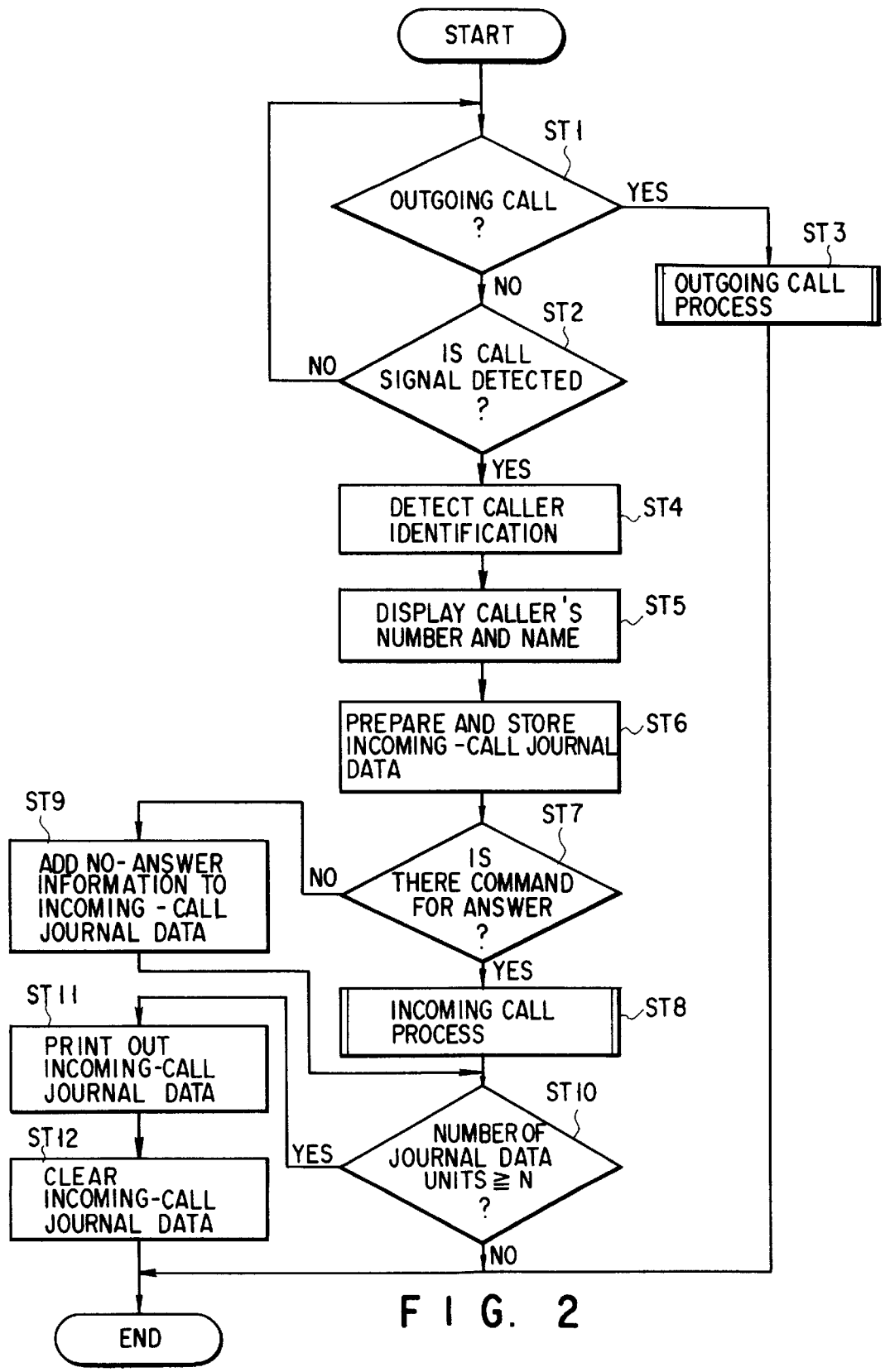
FIG. 2 is a flowchart illustrating the control procedures of a main control section in FIG. 1.

The operation of the facsimile apparatus having the above structure will now be described with reference to the flowchart (FIG. 2) illustrating the operational procedure of CPU 1-1.

In the standby state the CPU 1-1 waits for the occurrence of an outgoing call request or the detection of a call signal by the call signal detection unit 2-5 (step ST1 and step ST2).

If the outgoing call request has occurred in the standby state, the CPU 1-1 performs an outgoing call process according to a conventional procedure (step ST3).

Figure 3:
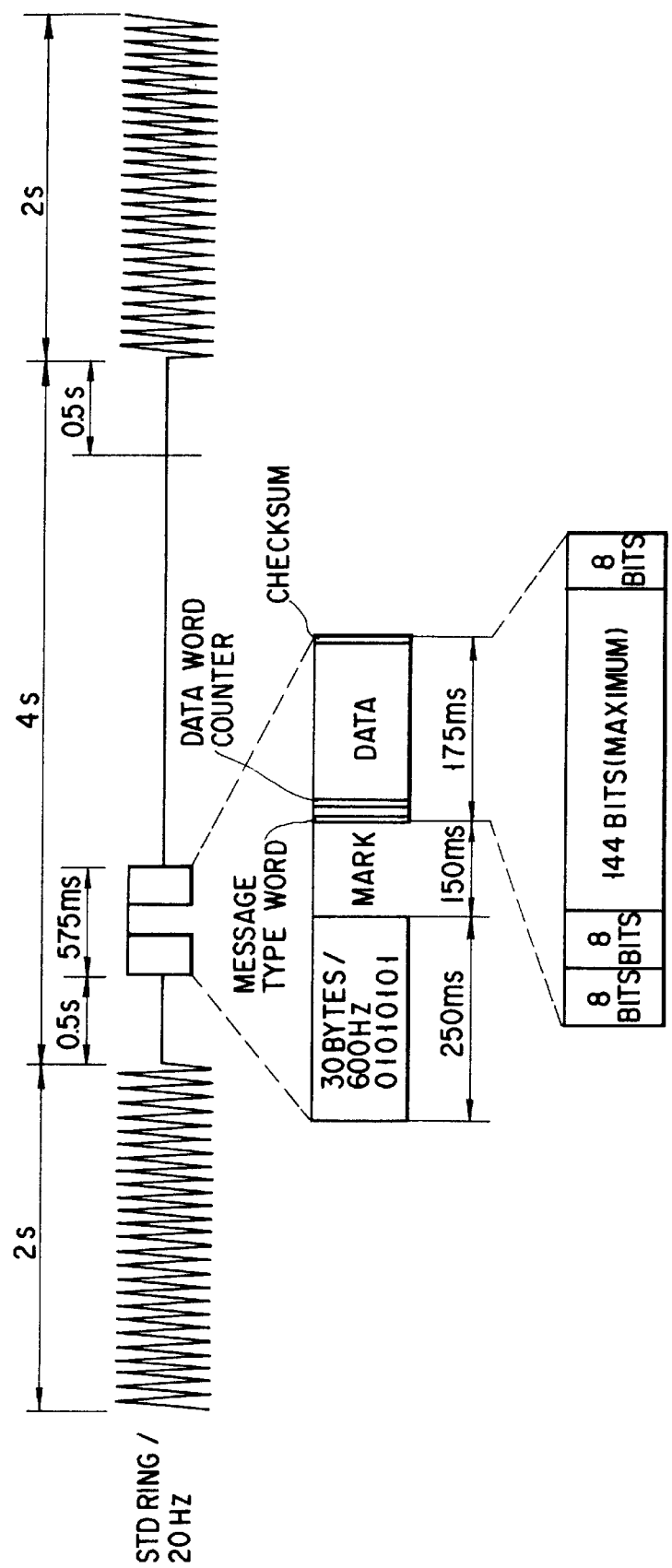
FIG. 3 shows data format of a call signal and a caller identification signal sent from a network side to an incoming call side.

On the other hand, if an incoming call has occurred, a call signal is sent from the network through the communication line C. As shown in FIG. 3, the call signal includes two-second 20 Hz ringing signal components at an interval of a four-second ringing signal stop period. The first call signal component is followed by a 0.5-second pose period and then by a caller identification signal having a format shown in FIG. 3 which is produced by FSK-modulating caller identification.

In the standby state, the FAX/TEL change-over switch 2-2 is connected to the built-in telephone 3, as shown in FIG. 1. If the call signal comes from the network through the communication line C, the call signal is delivered to the call signal detection unit 2-5. The call signal is then detected by the call signal detection unit 2-5 and the CPU 1-1 is informed of the detection of the call signal through the system bus 10.

If the CPU 1-1 is informed by the call signal detection unit 2-5, the CPU 1-1 detects the caller identification following the first call signal component, from the signal received by the caller identification transformer unit 2-4 and MODEM unit 4 (step ST4). The CPU 1-1 controls the LCD 9a to display, as shown in FIG. 4, the number and name of the caller which are contained in the caller identification (step ST5). In addition, the CPU 1-1 prepares incoming-call journal data indicating the number and name of the caller as well as date and time and stores the prepared information in the received-call information memory unit 5 (step ST6). The date and time information may be produced on the basis of information of a clock circuit (not shown) or, if possible, on the basis of date and time information contained in the caller identification.

Subsequently, the CPU 1-1 determines whether a command for a answer to the call has been issued until the call signal ceases to come (step ST7). For example, if a communication start key included in the keys 9b is depressed or the built-in telephone 3 is taken off the hook, the CPU 1-1 performs the incoming call process (step ST8). This incoming call process is a well-known process for performing a facsimile (FAX) communication process or a telephone call process on an as-needed basis. On the other hand, if no command has issued for a answer to the call until the call signal ceases to come, the CPU 1-1 adds information of "no response" to the incoming-call journal data stored in the incoming-call journal data memory unit 5 in step ST6 (step ST9).

If the process in step ST8 or step ST9 is completed, the CPU 1-1 determines whether the number of incoming-call journal data units stored in the incoming-call journal data memory unit 5 has reached a predetermined number N (e.g. 40) (step ST10). If the number of incoming-call journal data units is less than the number N, the process is completed and returned to the standby state. If the number of incoming-call journal data units is not less than the number N, the CPU 1-1 controls the print unit 7 to print out an image, as shown in FIG. 5, of the incoming-call journal data stored in the incoming-call journal data memory unit 5 (step ST11). After the journal has been printed out, the CPU 1-1 clears the incoming-call journal data memory unit 5 in order to store new incoming-call journal data and completes the process. In the image shown in FIG. 5, the incoming-call journal data to which data representing "no response" has been added is indicated by mark "no response".

As has been described above, according to the present invention, when incoming call has occurred, caller identification sent from the network side is detected and the number and name of the caller contained in the caller identification are displayed on the LCD 9a before answering to the incoming call.

Thus, the user can recognize the caller on the basis of the display image on the LCD 9a before answering to the call, and can decide whether or not to answer to the call in consideration of the caller.

Whether the user answers to the incoming call or not, the incoming-call journal data containing the number and name of the caller as well as the associated date and time is prepared and stored in the incoming-call journal data memory unit 5. If the user has not answered to the incoming call, information representing "no response" is added to the incoming-call journal data. The print unit 7 prints out an image indicating the incoming-call journal data each time the number of incoming-call journal data units stored in the incoming-call journal data memory unit 5 has reached a predetermined number N. In the printed-out image, an incoming call to which no answer has been made is indicated by mark "no response".

Accordingly, the user can confirm the incoming-call journal data relating to the incoming call to which no answer has been made. In other words, the user can confirm all the incoming calls regardless of whether they have been answered or not. As a result, it is possible to precisely know how the incoming calls have been received, e.g. "the incoming call from a certain caller was not answered at the first reception, but answered at the second reception".

In the present embodiment, as seen from the foregoing description, the caller identification is received regardless of whether the call is made from a phone or a facsimile apparatus, and is stored in the incoming-call journal data memory unit 5. The caller identification stored in the incoming-call journal data memory unit is displayed and printed out regardless of whether the call was from a phone or a facsimile apparatus. Therefore, the user can keep track of the incoming-call history, (i.e. how the incoming calls have been received) of all the incoming calls from both phones and facsimile apparatuses, without fail.

Second Embodiment

A second embodiment of the present invention will now be described.

Figure 6:
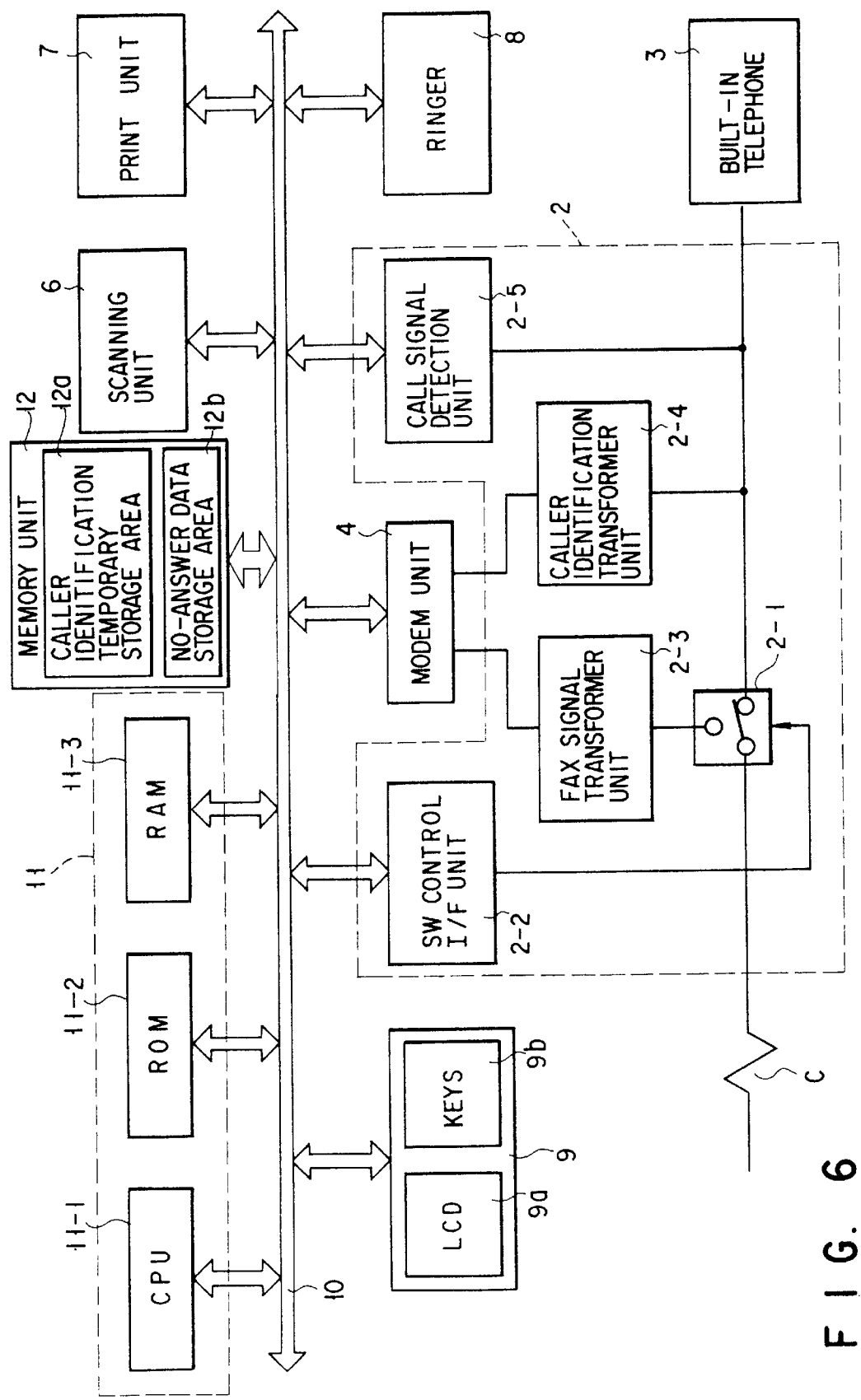
FIG. 6 is a functional block diagram showing a main structure of a facsimile apparatus according to a second embodiment of the present invention.

FIG. 6 is a functional block diagram showing a main structure of a facsimile apparatus according to the second embodiment. The structural parts common to those in FIG. 1 are denoted by like reference numerals and a detailed description thereof is omitted.

The facsimile apparatus of this embodiment, as shown in FIG. 6, comprises a network control section 2, a built-in telephone 3, a MODEM unit 4, a scanning unit 6, a print unit 7, a ringer 8, an operation panel unit 9, a main control section 11 and a memory unit 12. The network control section 2, MODEM unit 4, scanning unit 6, print unit 7, ringer 8, operation panel unit 9, main control section 11 and memory unit 12 are interconnected by means of a system bus 10.

The facsimile apparatus of the second embodiment differs from that of the first embodiment in that the main control section 1 in the first embodiment is replaced with the main control section 11 and the incoming-call journal data memory unit 5 in the first embodiment is replaced with the memory unit 12.

The main control section 11 comprises a CPU 11-1, a ROM 11-2 and a RAM 11-3. The CPU 11-1, ROM 11-2 and RAM 11-3 are all connected to the system bus 10. The CPU 11-1 operates according to operation programs stored in the ROM 11-2 and controls the operation of each structural part, thereby effecting the total operation of the facsimile apparatus. The ROM 11-2 stores in a fixed manner the operation programs for the CPU 11-1 and the information necessary for the various processing carried out by the CPU 11-1. The RAM 11-3 temporarily stores various data necessary for the various processing performed by the CPU 11-1.

The CPU 11-1 in the main control section 11 runs the operation programs stored in the ROM 11-2, and thus the main control section 11 can achieve the following first to fourth control means in addition to the general control means in the facsimile apparatus: 1) to detect caller identification taken in through a caller identification transformer unit 2-4 and the MODEM unit 4 and recognize the caller identification, 2) to monitor the occurrence of a specified trouble (e.g. shortage of printing paper sheets in the print unit 7) which disables reception of facsimile information, and determine whether or not facsimile information can be received, 3) to generate no-answer information in connection with an incoming call on the basis of the caller identification detected and recognized by the first means when the second means has determined that facsimile information cannot be received, and store the no-answer information in the memory unit 12, and 4) to control the print unit 7 to print out an image of no-answer information stored in the memory unit 12 when the troubled state has been normalized to make it possible to receive the facsimile information.

The memory unit 12 includes an caller identification temporary storage area 12a and a no-answer information storage area 12b. During incoming call reception, the caller identification temporary storage area 12a temporarily stores the caller identification detected and recognized by the main control section 11 with respect to the incoming call. The no-answer information storage area 12b stores the no-answer information generated by the main control section 11. The memory unit 12, where necessary, is provided with storage areas for storing various speech message data and document message data to be output to the operator.

The operation of the facsimile apparatus having the above structure will now be described with reference to the flowchart (FIG. 7) illustrating the control procedure of the CPU 11-1.

In the standby state, the CPU 11-1 waits for normalization of a troubled state which disabled facsimile reception, or occurrence of a call request, or detection of a call signal by the call signal detection unit 2-5 (steps ST11 to ST13).

If the call request has occurred in the standby state, the CPU 11-1 performs an outgoing call process according to a conventional procedure (step ST14).

On the other hand, if an incoming call has occurred, a ringing signal is sent from the network through the communication line C. In the standby state, the FAX/TEL change-over switch 2-2 is connected to the built-in telephone 3, as shown in FIG. 6. The call signal coming from the network through the communication line C is delivered to the call signal detection unit 2-5. The call signal is then detected by the call signal detection unit 2-5 and the CPU 11-1 is informed of the detection of the call signal through the system bus 10.

If the CPU 11-1 is informed by the call signal detection unit 2-5, the CPU 11-1 detects, irrespective of feasibility of facsimile reception, the caller identification following the first call signal component, from the signal received by the caller identification transformer unit 2-4 and MODEM unit 4 (step ST15).

Subsequently, the CPU 11-1 determines whether the facsimile information can be received (step ST16). If the facsimile information can be received without trouble, caller identification is stored in the caller identification temporary storage area 12a (step ST17). The CPU 11-1 performs a conventional facsimile reception procedure (step ST18). If the facsimile reception procedure is completed, the CPU 11-1 finishes the series of processing and enters the standby state. The caller identification stored in the caller identification temporary storage area 12a is used to display the number and name of the caller on the LCD 9a.

On the other hand, if a specified trouble has occurred and facsimile reception is not possible, the CPU 11-1 prepares, on the basis of the caller identification detected in step ST15, no-answer information which can be obtained, for example, by associating the number and name of the caller with the date and time of the incoming call, and stores the prepared no-answer information in the no-answer information storage area 12b in the memory unit 12 (step ST19). The CPU 11-1 then stores the caller identification detected in step ST15 in the caller identification temporary storage area 12a in the memory unit 12 (step ST20). Thereafter, the CPU 11-1 finishes the series of processing without carrying out the facsimile information receiving process and enters the standby state.

If the CPU 11-1 detects in the standby state the normalization of the troubled state which disabled the facsimile reception, it determines whether or not the no-answer information is stored in the no-answer information storage area 12b (step ST21). If the no-answer information is stored, the CPU 11-1 prepares no-answer journal data on the basis of the no-answer information, for example, as an image shown in FIG. 8 and controls the print unit 7 to print out the image (step ST22). After the no-answer journal has been printed out, the CPU 11-1 clears the no-answer information storage area 12b in order to store new no-answer information which will be issued when the next trouble would occur (step ST23) and enters the standby state. If the no-answer information is not stored in the no-answer information storage area 12b when the troubled state has been normalized, i.e. if no call has been received in the troubled state, the CPU 11-1 returns directly to the standby state from step ST21 without performing the processing in steps ST22 and ST23.

According to the present embodiment, if an incoming call is received in a specified troubled state in which facsimile information cannot be received, the caller identification is detected without answering to the call. On the basis of the caller identification, no-answer information is prepared, for example, by associating the number and name of the caller with the date and time of the call, and stored in the no-answer information storage area 12b. After the troubled state has been normalized, an image showing the no-answer journal is printed out on the basis of the no-answer information stored in the no-answer information storage area 12b.

Accordingly, on the basis of the image printed out after the troubled state has been normalized, the user can identify the caller of the incoming call which was received in the troubled state and to which no answer could be made. For example, the user can request re-transmission of facsimile information to the caller.

Third Embodiment

A third embodiment of the present invention will now be described.

FIG. 9 is a functional block diagram showing a main structure of a facsimile apparatus according to the third embodiment. The structural parts common to those in FIG. 1 are denoted by like reference numerals and a detailed description thereof is omitted.

The facsimile apparatus of this embodiment, as shown in FIG. 9, comprises a network control section 2, a built-in telephone 3, a MODEM unit 4, a scanning unit 6, a print unit 7, a ringer 8, an operation panel unit 9, a main control section 13 and a map data memory unit 14. The network control section 2, MODEM unit 4, scanning unit 6, print unit 7, ringer 8, operation panel unit 9, main control section 13 and map data memory unit 14 are interconnected by means of a system bus 10.

The facsimile apparatus of the third embodiment differs from that of the first embodiment in that the main control section 1 in the first embodiment is replaced with the main control section 13 and the incoming-call journal data memory unit 5 in the first embodiment is replaced with the map data memory unit 14.

The main control section 13 comprises a CPU 13-1, a ROM 13-2 and a RAM 13-3. The CPU 13-1, ROM 13-2 and RAM 13-3 are all connected to the system bus 10. The CPU 13-1 operates according to operation programs stored in the ROM 13-2 and controls the operation of each structural part, thereby effecting the total operation of the facsimile apparatus. The ROM 13-2 stores in a fixed manner the operation programs for the CPU 13-1 and the information necessary for the various processing carried out by the CPU 13-1. The RAM 13-3 temporarily stores various data necessary for the various processing performed by the CPU 13-1.

The CPU 13-1 in the main control section 13 runs the operation programs stored in the ROM 13-2, and thus the main control section 13 can achieve the following first to fourth control means in addition to the general control means in the facsimile apparatus: 1) to detect caller identification taken in through a caller identification transformer unit 2-4 and the MODEM unit 4 and recognize the caller identification, 2) to store in the map data memory unit 14 an image scan by the scanning unit 6 at the time of a map registration request as map data and separately designated coordinate values associated with the map data of the scan image, 3) to determine the location of the caller on the basis of the caller identification detected and recognized by the first means, and 4) to control the print unit 7 to print out a call location map indicating the location of the caller determined by the third means in the map data stored in the map data memory 14.

The map data memory unit 14 stores map data.

Figure 10:
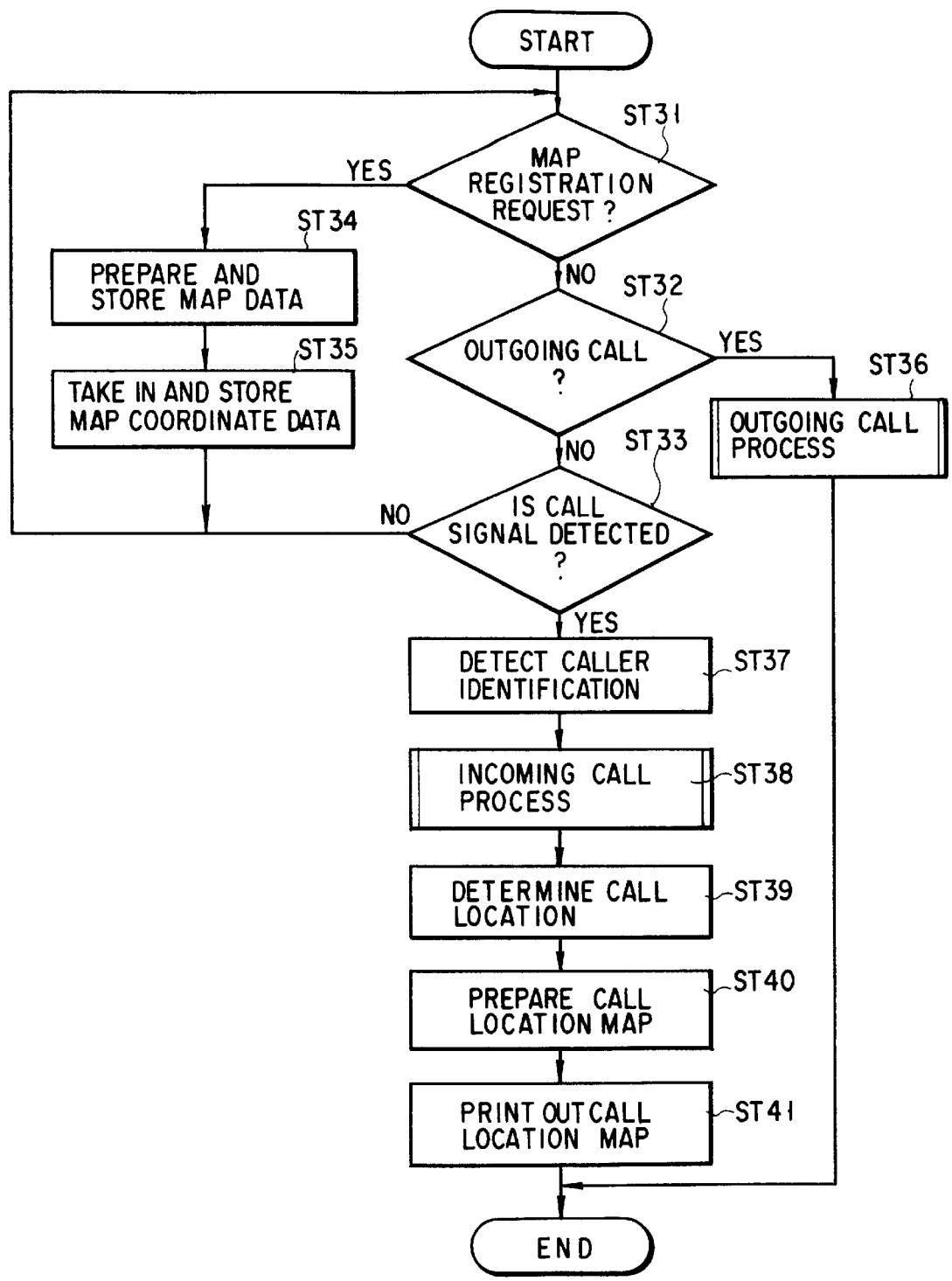
FIG. 10 is a flowchart illustrating the control procedures of a main control section in FIG. 9.

The operation of the facsimile apparatus having the above structure will now be described with reference to the flowchart (FIG. 10) illustrating the control procedure of the CPU 13-1.

In the standby state, the CPU 13-1 waits for a map registration request, occurrence of an outgoing call request, or detection of a call signal by the call signal detection unit 2-5 (steps ST31 to ST33).

If the user, in the standby state, sets a map to be registered on the scanning unit 6 and inputs a registration request by a predetermined designation operation by means of, e.g. the keys 9b, the CPU 13-1 enables the scanning unit 6 to scan the map and stores obtained image data in the map data memory unit 14 as map data (step ST34). Then, the CPU 13-1 permits input of coordinate values of the map by of a predetermined designating operation by means of, e.g. the keys 9b. The input coordinate values are associated with the map data as map coordinate information and stored in the map data memory unit 14 (step ST35). Then the CPU 13-1 enters the standby state. The coordinate values input in step ST35 indicate, for example, the four corners of the map. If the registered map is that shown in FIG. 11, the input coordinate values are longitude values A and B and latitude values C and D.

On the other hand, if the outgoing call request has occurred in the standby state, the CPU 13-1 performs an outgoing call process according to a conventional procedure (step ST36).

If an incoming call has occurred, a ringing signal is sent from the network through the communication line C. In the standby state, the FAX/TEL change-over switch 2-2 is connected to the built-in telephone 3, as shown in FIG. 9.

The call signal coming from the network through the communication line C is delivered to the call signal detection unit 2-5. The call signal is then detected by the call signal detection unit 2-5 and the CPU 13-1 is informed of the detection of the call signal through the system bus 10.

If the CPU 13-1 is informed by the call signal detection unit 2-5, the CPU 13-1 detects the caller identification following the first call signal component, from the signal received by the caller identification transformer unit 2-4 and MODEM unit 4 (step ST37). Then, the CPU 13-1 performs the incoming call process (step ST38). This incoming call process is a well-known process for performing a facsimile (FAX) communication process or a telephone call process, or for waiting for stop of the call signal without answering to the incoming call, on an as-needed basis.

If the incoming call process is completed, the CPU 13-1 determines the location of the call (location of the caller) on the basis of the caller identification detected in step ST37 (step ST39). In this case, if the coordinate information of the location of the call is included in the caller identification, such information is extracted.

Then, the CPU 13-1 forms a call location map by synthesizing the map data stored in the map data memory unit 14 and a predetermined image indicating the call position (step ST40). The CPU 13-1 then controls the print unit 7 to print out the call location map (step ST41). Specifically, the call position map is produced, for example, in the following manner. If the call location is the coordinates (=longitude B and latitude F), the position corresponding to the coordinates (=longitude E and latitude F) is determined in the registered map, as shown in FIG. 12, in consideration of the coordinates of the four corners (longitude A and latitude C), (longitude A and latitude D), (longitude B and latitude C) and (longitude B and latitude D) set in the registered map shown in FIG. 11. At the position of these coordinates, a predetermined symbol (★) indicating the call location is indicated by synthesis. In addition, characters indicating the name and address of the caller are synthesized near the call location. Thus, the call location map, for example, as shown in FIG. 12, is obtained.

As has been described above, according to the present embodiment, the image of the map to be registered is scan and stored in the map data memory unit 14. When the incoming call is received, the coordinate information of the call location are extracted from the caller identification, thereby to determine the call location. The call location map prepared by indicating the call location on the registered map is formed and printed out.

If viewing the printed-out call location map, the user can easily identify the call location. Accordingly, in the case of delivery of food (e.g. pizza), the deliverer can easily and exactly recognize the location of the customer and enhance the efficiency of work.

The present invention is not limited to the above embodiments. For example, in the first embodiment, the LCD 9a displays the number and name of the caller. However, the LCD 9a may display any information included in the caller identification.

In the first embodiment, the content of the incoming-call journal data memory unit 5 is cleared each time an N-number of incoming-call journal data units have been stored. However, the content of the memory unit 5 may be cleared at regular time intervals. Alternatively, the incoming-call journal data units stored in the earliest time period may be cleared each time there is a need to store new incoming-call journal data units. Thus, an N-number of the newest incoming-call journal data units may always be stored.

In the first embodiment, the incoming-call journal data units stored in the incoming-call journal data memory unit 5 are printed out each time the N-number of incoming-call journal data units have been stored. However, the data units in the memory unit 5 may be printed out at regular time intervals. The timing for printing out the incoming-call journal data stored in the incoming-call journal data memory unit 5 may not coincide with the timing for clearing the information in the memory unit 5.

The image indicating the incoming-call journal data to be printed out is not limited to that shown in the first embodiment, and may be freely chosen.

In the second embodiment, the no-answer information is printed out. However, the no-answer information may be displayed on the display such as LCD 9*a* or may be told to the user by means of output speech messages.

The content and image of the no-answer information are not limited to those in the second embodiment and may be freely chosen.

In the second embodiment, speech message data or document message data for requesting re-transmission of information to the counterpart may be stored in the memory unit 12. Thus, if the troubled state is normalized, the number of the caller stored in the no-answer information storage area 12*b* may be automatically dialed and the speech message data or document message data may be sent to the counterpart to request the re-transmission of information. This is more practically advantageous. In this case, for example, the CPU 11-1 may perform a process of repeating the transmission of the message by the amount corresponding to the no-answer information stored in the no-answer information storage area 12*b* between steps ST22 and ST23 in FIG. 7. Specifically, as shown in FIG. 13, the CPU 11-1 selects, after step ST22, one of the no-answer information units stored in the no-answer information storage area 12*b* and determines the associated telephone number from the no-answer information unit (i.e. the telephone number of the caller of the incoming call to which no answer could be made) (step ST24). Then, the CPU 11-1 automatically dials the telephone number determined in step ST24 and sends the message (step ST25). After the message has been sent, the CPU 11-1 determines whether or not there is another no-answer information unit in the no-answer information storage area 12*b* (step ST26). If there is another no-answer information unit, the processing of step ST24 and subsequent steps is repeated and the message is sent to the counterpart associated with the no-answer information unit. If the message has been sent to the counterparts associated with all no-answer information units stored in the no-answer information storage area 12*b*, the control of the CPU 11-1 goes to step ST23.

In the third embodiment, the data obtained by scanning the map by means of the scanning unit 6 is used as map data. However, it is possible to use initially digitized map data. In this case, for example, a CD-ROM may be used as storage medium of map data.

In the third embodiment, the call location is determined by extracting the coordinate information included in the caller identification. However, for example, the coordinates of the call location may be associated with the number of the caller in advance, and the coordinates registered in association with the number of the caller included in the caller identification may be searched at the time of call reception. Thus, the call location may be determined.

In the third embodiment, the call location map is printed out. However, the call location map may be displayed on the display such as LCD 9*a*.

In each of the above embodiments, the LCD 9*a* is used as display means. However, the LCD 9*a* may be replaced with another display such as an LED.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A facsimile apparatus comprising:

a detector which detects a call signal sent from a communication network to which the facsimile apparatus is connected;

a receiver which receives an identification unit included in said call signal, said identification unit specifying a caller;

a storage device which stores predetermined information;

a display which displays the predetermined information;

a printer which prints the predetermined information;

reception control means which causes said receiver to receive said identification unit in response to a detection of said call signal by said detector;

display control means which causes said display to display the received identification unit when said receiver receives said identification unit;

first storage control means which causes said storage device to store the received identification unit when said receiver receives said identification unit;

determination means which determines whether a response has been made to said call signal after said identification unit is stored in said storage device by said first storage control means;

process means which executes a predetermined incoming call process when said determination means determines said call signal as having been answered;

second storage control means which additionally stores in said storage device non-answered information indicating that said call signal has not been answered when the determination means determines that no answer has been made to said call signal, in such a manner that said non-answered information corresponds to said identification unit stored in said storage device by said first storage control means; and print control means which causes said printer to automatically print out at a predetermined timing the identification unit stored in said storage device regardless of whether the call signal including the identification unit has been answered or not, wherein the identification unit included in the non-answered call signal is printed out along with corresponding non-answered information which has been stored in said storage device to correspond to the identification unit.

2. The facsimile apparatus according to claim 1, wherein said first storage means stores in said storage device all identification units received by said receiver until the number of already stored identification units has reached a predetermined value.

3. The facsimile apparatus according to claim 1, wherein said print control means prints out in a table format a predetermined number of identification units stored in said storage device, each time the number of the identification units has reached a predetermined value.

4. The facsimile apparatus according to claim 1, wherein said print control means prints out in a table format the identification units stored in said storage device in every predetermined period.

5. The facsimile apparatus according to claim 1, wherein said identification units and the non-answered information stored in said storage device are erased after said printer finishes its printing operation.

6. A facsimile apparatus comprising:

a built-in telephone;

a modem;

a switch which selectively connects said modem and said built-in telephone to a communication network to which the facsimile apparatus is connected;

a detector which detects a call signal sent from said communication network;

a receiver which receives an identification unit included in said call signal, said identification unit specifying a caller;

a storage device which stores predetermined information;

a display which displays predetermined information;

a printer which prints predetermined information;

reception control means which causes said receiver to receive the identification unit in response to a detection of said call signal by the detector, regardless of whether the caller uses a telephone or a facsimile apparatus;

display control means which causes said display to display the received identification unit when said receiver receives said identification unit, regardless of whether the caller is a telephone or a facsimile apparatus;

first storage control means which causes said storage device to store the received identification unit when said receiver receives said identification unit, regardless of whether the caller uses a telephone or a facsimile apparatus; determination means which determines whether a response has been made to said call signal after said identification unit is stored in said storage device by said first storage control means;

process means which executes a predetermined incoming call process of connecting one of said built-in telephone and said modem by means of said switch, when said determination means determines said call signal as having been answered;

second storage control means which additionally stores non-answered information in said storage device regardless of whether the caller uses a telephone or a facsimile apparatus and when said determination means determines that no answer has been made to said call signal, said non-answered information being stored to correspond to said identification unit stored in said storage device by said first storage control means, and said non-answered information indicating that said call signal has not been answered; and print control means which causes said printer to automatically print out at a predetermined timing the identification unit stored in said storage device regardless of whether the call signal including the identification unit has been answered or not, wherein the identification unit included in the non-answered call signal is printed out along with corresponding non-answered information which has been stored in said storage device to correspond to the identification unit.

* * * * *